United States Patent [19]

Peters

[11] Patent Number: 5,179,669
[45] Date of Patent: Jan. 12, 1993

[54] MULTIPROCESSOR INTERCONNECTION AND ACCESS ARBITRATION ARRANGEMENT

[75] Inventor: Daniel V. Peters, Warrenville, Ill.

[73] Assignee: AT&T Bell Laboratories, Murray Hill, N.J.

[21] Appl. No.: 235,069

[22] Filed: Aug. 22, 1988

[51] Int. Cl.⁵ .................................. G06F 13/364
[52] U.S. Cl. ................................. 395/325; 370/1; 370/68; 364/927.98; 364/935.2; 364/965.9
[58] Field of Search ... 364/200 MS File, 900 MS File; 370/85.6, 85.7, 85.9, 1

[56] References Cited

U.S. PATENT DOCUMENTS

| | | | |
|---|---|---|---|
| 3,916,380 | 10/1975 | Fletcher et al. | 340/147 R |
| 4,064,421 | 12/1977 | Gajski et al. | 364/716 |
| 4,201,889 | 5/1980 | Lawrence et al. | 370/68 |
| 4,201,890 | 5/1980 | Lawrence et al. | 370/68 |
| 4,201,891 | 5/1980 | Lawrence et al. | 370/58 |
| 4,229,791 | 10/1980 | Levy et al. | 364/200 |
| 4,271,506 | 6/1981 | Broc et al. | 370/89 |
| 4,385,350 | 5/1983 | Hansen et al. | 364/200 |
| 4,467,418 | 8/1984 | Quinquis | 364/200 |
| 4,608,700 | 8/1986 | Kirtley, Jr. et al. | 375/36 |
| 4,620,278 | 10/1986 | Ellsworth et al. | 364/200 |
| 4,633,394 | 12/1986 | Georgiou et al. | 364/200 |
| 4,692,862 | 9/1987 | Cousin et al. | 364/200 |
| 4,724,520 | 2/1988 | Athanas et al. | 364/200 |
| 4,730,268 | 3/1988 | Marin | 364/900 |
| 4,745,548 | 5/1988 | Blahut | 364/200 |
| 4,811,210 | 3/1989 | McAulay | 364/200 |
| 4,881,164 | 11/1989 | Hailpern et al. | 364/200 |
| 4,885,739 | 12/1989 | Read et al. | 370/58.1 |
| 4,897,833 | 1/1990 | Kent et al. | 370/85.2 |
| 4,922,486 | 5/1990 | Lidinsky et al. | 370/60 |
| 4,933,936 | 6/1990 | Rasmussen et al. | 370/85.9 |

FOREIGN PATENT DOCUMENTS 8102643 9/1981 World Int. Prop. O. .

OTHER PUBLICATIONS

M. I. Lilie et al. "Crosspoint Switch for ATS", *IBM Technical Disclosure Bulletin*, vol. 20, No. 2, (Jul. 1977) pp. 816-817.

C. K. Baru et al., "The Architecture of SM3: A Dynamically Partitionable Multicomputer System," *IEEE Transactions on Computers*, vol. C-35, No. 9 (Sep. 1986), pp. 790-801.

N. Kronenberg et al., "VAXclusters: A Closely-Coupled Distributed System," *ACM Transactions on Computer Systems*, vol. 4, No. 2 (May 1986), pp. 130-146.

P. Enslow, Jr. (ed.), *Multiprocessors and Parallel Processing*, John Wiley & Sons (1974), pp. 32-36.

D. Vlack et al., "An Experimental Digital Video Switching Architecture," *ISS '84* (Florence, Italy, 1984).

G. Richards et al., "A Two State Rearrangeable Broadcast Switching Network", *IEEE Transactions on Communications*, vol. COM-33, No. 10 (Oct. 1985), pp. 1025-1035.

*Primary Examiner*—Gareth D. Shaw
*Assistant Examiner*—John Q. Chavis
*Attorney, Agent, or Firm*—David Volejnicek

[57] ABSTRACT

In a multiprocessor system (FIG. 1), the processors (10-12) are interconnected by a non-blocking communication medium such as a crossbar switch (19). Each processor is connected to a dedicated port circuit (18) at the switch by an optical link (16). Each port circuit is connected to the crossbar switch by an electrical link (20). The port circuits are interconnected by a contention medium (14). A port circuit sends an access request by its connected processor to the destination processor over the contention medium. Circuitry (205) at each port circuit receives requests, for access to the connected processor, prioritizes conflicting requests, and grants them sequentially. The circuitry interleaves grants of access to the connected processor with grants of outgoing access requests made by the connected processor. The circuitry grants an access request by causing the crossbar switch to establish the corresponding connection.

19 Claims, 8 Drawing Sheets

| | SIGNAL LINE EVENT | | | | | | | | SIGNAL LINE ACTION | | | | | |
|---|---|---|---|---|---|---|---|---|---|---|---|---|---|---|
| | 430 | 431 | 461 | 464 | 466 | 465 | 463 | 458 | 460 | 462 | 456 | 457 | | |
| TRANSITION VECTOR / PRESENT STATE | CI_RESET | CI_REQUEST | INC_REQUEST | REQ_WITHDRAWN | LOOPAROUND | MULT_REQ_PNDG | GRANTED | GRANT_TIMEOUT | TRANS_TIMEOUT | ENAB_REQUEST | ESTAB_LINK | START_GRANT_TMR | START_TRANS_TMR | NEXT STATE |
| 701 ANY 600-604 | 1 | X | X | X | X | X | X | X | X | 0 | 0 | 0 | 0 | IDLE 600 |
| 702 IDLE 600 | 0 | 1 | X | X | X | X | X | X | X | 1 | 0 | 1 | 0 | WAITING_GRANT 601 |
| 703 IDLE 600 | 0 | 0 | 1 | X | X | X | X | X | X | 0 | 1 | 0 | 1 | LINKED_DEST 604 |
| 704 WAITING_GRANT 601 | 0 | 1 | X | X | X | X | 1 | X | X | 1 | 0 | 0 | 1 | LINKED_SOURCE 603 |
| 705 WAITING_GRANT 601 | 0 | 1 | X | X | X | X | 0 | 0 | X | 1 | 0 | 0 | 0 | WAITING_GRANT 601 |
| 705 WAITING_GRANT 601 | 0 | 1 | 0 | X | X | X | 0 | 1 | X | 1 | 0 | 1 | 0 | WAITING_GRANT 601 |
| 706 WAITING_GRANT 601 | 0 | 1 | 1 | X | X | X | 0 | 1 | X | 0 | 1 | 0 | 1 | LINKED_DEST 604 |
| 706 WAITING_GRANT 601 | 0 | 0 | 1 | X | X | X | X | X | X | 0 | 1 | 0 | 1 | LINKED_DEST 604 |
| 707 WAITING_GRANT 601 | 0 | 0 | 0 | X | X | X | X | X | X | 0 | 0 | 0 | 0 | IDLE 600 |
| 708 WAITING_GRANT 601 | 0 | 1 | X | X | 1 | X | X | X | X | 1 | 1 | 0 | 1 | LOOPAROUND 602 |
| 709 LINKED_SOURCE 603 | 0 | X | 0 | X | X | X | 0 | X | X | 0 | 0 | 0 | 0 | IDLE 600 |
| 709 LINKED_SOURCE 603 | 0 | 0 | 0 | X | X | X | X | X | X | 0 | 0 | 0 | 0 | IDLE 600 |
| 710 LINKED_SOURCE 603 | 0 | 1 | X | X | X | X | 1 | X | 0 | 1 | 0 | 0 | 0 | LINKED_SOURCE 603 |
| 710 LINKED_SOURCE 603 | 0 | 1 | 0 | X | X | X | 1 | X | 1 | 1 | 0 | 0 | 1 | LINKED_SOURCE 603 |
| 711 LINKED_SOURCE 603 | 0 | X | 1 | X | X | X | 0 | X | X | 0 | 1 | 0 | 1 | LINKED_DEST 604 |
| 711 LINKED_SOURCE 603 | 0 | 0 | 1 | X | X | X | X | X | X | 0 | 1 | 0 | 1 | LINKED_DEST 604 |
| 711 LINKED_SOURCE 603 | 0 | X | 1 | X | X | X | X | X | 1 | 0 | 1 | 0 | 1 | LINKED_DEST 604 |
| 712 LINKED_DEST 604 | 0 | X | X | 1 | X | X | X | X | X | 0 | 0 | 0 | 0 | IDLE 600 |
| 712 LINKED_DEST 604 | 0 | X | X | 0 | X | 1 | X | X | 1 | 0 | 0 | 0 | 0 | IDLE 600 |
| 712 LINKED_DEST 604 | 0 | 1 | X | 0 | X | X | X | X | 1 | 0 | 0 | 0 | 0 | IDLE 600 |
| 713 LINKED_DEST 604 | 0 | X | X | 0 | X | X | X | X | 0 | 0 | 1 | 0 | 0 | LINKED_DEST 604 |
| 713 LINKED_DEST 604 | 0 | 0 | X | 0 | X | 0 | X | X | 1 | 0 | 1 | 0 | 1 | LINKED_DEST 604 |
| 714 LOOPAROUND 602 | 0 | 1 | X | X | X | X | X | X | 0 | 1 | 1 | 0 | 0 | LOOPAROUND 602 |
| 714 LOOPAROUND 602 | 0 | 1 | X | X | X | 0 | X | X | 1 | 1 | 1 | 0 | 1 | LOOPAROUND 602 |
| 715 LOOPAROUND 602 | 0 | 0 | X | X | X | X | X | X | X | 0 | 0 | 0 | 0 | IDLE 600 |
| 715 LOOPAROUND 602 | 0 | 1 | X | X | X | 1 | X | X | 1 | 0 | 0 | 0 | 0 | IDLE 600 |

SEQUENCER STATE TRANSITION VECTORS

FIG. 7

MULTIPROCESSOR INTERCONNECTION AND ACCESS ARBITRATION ARRANGEMENT

TECHNICAL FIELD

This invention relates generally to the computer art, and particularly concerns the interconnection for communication of the processors in a multiprocessor system and the arbitration between the processors for access to one another through the interconnection.

BACKGROUND OF THE INVENTION

In a multiprocessor system, the functional characteristics of the interprocessor interconnection medium are a significant constraint on system performance. Characteristics sought in the medium include fast access arbitration, fair arbitration (i.e., no unit is starved for access), independence of connections (i.e., a connection between some units does not constrain connections between other units), deadlock prevention, equal opportunity for a processor to send and to receive, and modular growth capability.

It is preferable to use a non-blocking medium—one that allows any interconnection that the processors are capable of handling to be made at any time. Such a medium is most versatile and efficient, in that it does not limit the type and number of interconnections between processors that may be made. It therefore delays the establishment of inter-processor connections the least of any interconnection arrangement. Also, because it allows a plurality of independent connections to exist at a time, such a medium achieves higher communication bandwidth than other media (e.g., a bus). Furthermore, non-blocking media (such as a crossbar switch, for example) permit direct connection between a source and destination, and therefore do not suffer from the latency of message or packet-passing arrangements wherein establishment of connections depends on self-routing information that must be picked off, decoded, and acted upon to effect proper routing.

Because a non-blocking interconnection medium such as a crossbar switch theoretically allows any desired connection between any processors to be made at any time, arbitration of access to the medium itself is not necessary. This situation is unlike typical bus arbitration. In single bus arbitration, the bus is the resource in demand and the destination unit, e.g., processor, is assumed by the arbiter to be available. Conversely, in the situation of a non-blocking interconnection medium, the medium is assumed to be available and the destination unit, or the link(s) connecting the destination unit to the medium, is the resource in demand.

Contention for the destination units, e.g., processors, or their links to the medium, occurs because the units or links themselves may not be capable of handling simultaneous connections from a plurality of units wishing to connect thereto. For example, a processor is typically capable of being communicatively connected to only one other processor at any one time. Hence, there remains the need to arbitrate conflicting multiple requests for access to a unit or link.

Many different arbitration arrangements are known in the art. For example, centralized arbitration in a central control unit has been practiced in conjunction with crossbar switches in computer and telephone systems. Although centralized controller arbitration arrangements operate suitably to perform their intended function, they are not always desirable, because of the inherent system complexity resulting from the many interconnections required between the controller, the interconnection medium, and the interconnected units. Also, the centralized arrangements tend to be slower and more complex than other arrangements, and they typically do not allow for modular growth of the system. Furthermore, a reliability problem exists with such arrangements, since a malfunction of the controller may remove the whole system from operation. While it is true that this fault intolerance may be overcome by means of replicating the central control unit, it is an expensive and complex proposition.

It is known to use distributed arbitration arrangements, in which a central controller is not used to determine access and instead the interaction of the requesting units determines access in the event of simultaneous requests. Such distributed arrangements are often preferable, since the expense, complexity, and slowness of, and the reliability problems associated with, the centralized controller arrangements are avoided while modular growth of the system is facilitated. But an efficient arrangement of this nature that could be applied to a nonblocking medium such as a crossbar switch and provide fair arbitration, i.e., arbitration which does not favor certain processors in their access requests while "starving out" other processors from requested access, and one which eases bottlenecks and also eliminates the possibility of deadlock between processors, has not been available.

SUMMARY OF THE INVENTION

This invention is directed to solving these and other disadvantages of the prior art. According to the invention, a multiprocessor system which comprises a plurality of processors interconnected by a non-blocking communication medium, such as a crossbar switch, further includes a unique inter-processor access contention arrangement that enables each processor to independently arbitrate incoming access requests from other processors to itself, and illustratively also to arbitrate the incoming requests with its own outgoing access requests. The arrangement is structured as follows. A contention communication medium interconnects the processors. Each processor includes a facility for communicating a request to access another processor to the other processor across the contention medium. Each processor further includes a facility which responds to conflicting requests for access to its own processor that it receives from other processors across the contention medium, by resolving the conflicts and granting the requests to access its own processor sequentially. The arrangement further includes a facility that responds to the granting of an access request by establishing a connection through the non-blocking medium between the requesting processor whose request for access has been granted and the granting processor.

As the above characterization makes clear, contention within the system is not for access to the non-blocking medium, but to the individual processors. The bottlenecks and delays associated with contending for access to a shared medium are thus eliminated, and each processor is freed to accept access requests at its own pace, without impeding accesses to other processors. The separate contention medium allows access arbitration to occur independently of, and overlapped with, data transfers on the non-blocking medium. Furthermore, each processor not only includes its own contention resolution circuitry, thereby facilitating modular growth of the system, but uses that circuitry to resolve conflicting requests for access to itself. Each processor is therefore in complete control of whom it allows itself to be accessed by, and when, as opposed to relinquishing this function to some independent or shared entity. Symmetrically, it follows that a processor exerts no control over access—and the resolution of conflicting accesses—being made by other processors to other processors. Arbitration for access to a processor can therefore begin immediately upon the processor becoming free. There is no waiting for other transactions to complete. Access control in the system is thereby individualized and simplified, and hence made more versatile yet faster.

Specifically in an embodiment, the arbitration process to a processor takes the form of arbitration for a facility, such as a link, that couples the processor to the communication medium, and requests for access to the facility by the coupled processor are arbitrated along with the requests for access to the facility (and therethrough to the coupled processor) by other processors. Granting of these outgoing and incoming requests, respectively, is interleaved, thereby providing equal opportunity for a processor to access other processors and in turn to be accessed by the other processors.

The arrangement provides fair arbitration, preferably by recording all simultaneous or interfering access requests at each processor and servicing all of those requests before accepting and servicing any new requests. As a consequence, no processor is starved for access to another processor; rather, all processors are provided equal opportunity for access. The arrangement also provides effective deadlock prevention, by allowing a processor to withdraw its access request when that request has not been serviced within a predetermined period of time. Furthermore, a processor is not allowed to monopolize another processor once a communication has been established between them: a processor is forced to break off the established communications after a predetermined time.

These and other advantages and features of the invention will become more apparent from the following description of an illustrative embodiment of the invention considered together with the drawing.

BRIEF DESCRIPTION OF THE DRAWING

FIG. 7 is a state transition vector table for the state diagram of FIG. 6; and

DETAILED DESCRIPTION

Figure 1:
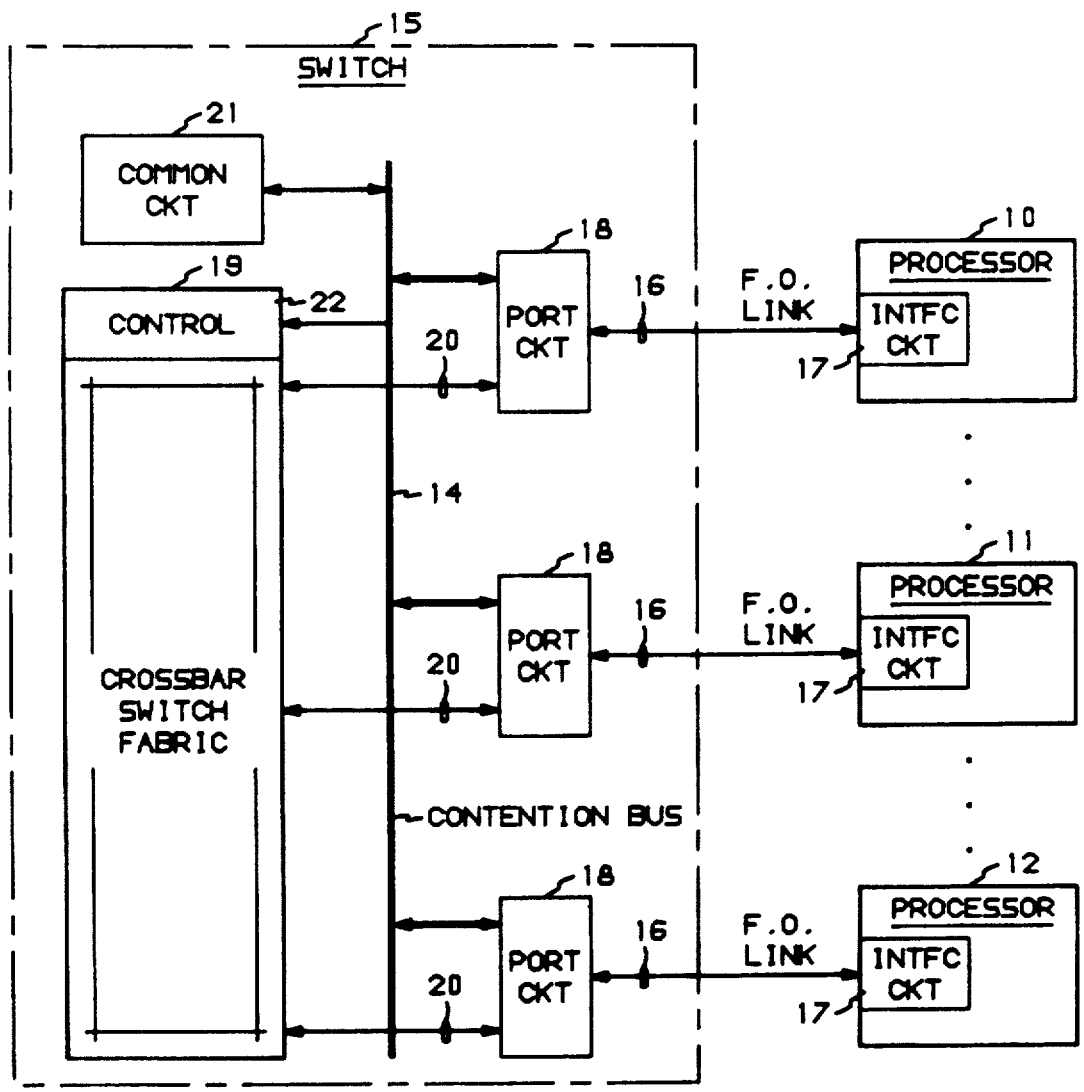
FIG. 1 is a block diagram of a multiprocessor including an illustrative embodiment of the invention.

FIG. 1 shows a multiprocessor system comprising a plurality of processors 10, 11, and 12, interconnected by a switch 15. Processors 10-12 may be any desired processors, illustratively the AT&T 3B2/600 computers. Each of the processors 10-12 is coupled to switch 15 by a duplex optical fiber link 16. An interface circuit 17 within each processor 10-12 converts signals passing between the processor and switch 15 between the optical and electrical domains and between bit-serial and bit-parallel formats, and translates the signals between whatever protocol is internally used and understood by the particular processor 10-12 and a protocol suitable for optical transmissions across link 16. Such interface circuits are well known in the art, and will not be discussed here in detail. An example of such a circuit is the XBI circuit of the 3B4000 computer of AT&T, used in conjunction with the DC 2491 lightwave data link of Hitachi Corporation.

Switch 15 includes a plurality of port circuits 18, one for each link 16 and hence one for each processor 10-12. These circuits are discussed in detail further below. Switch 15 further includes a nonblocking crossbar switch fabric 19 and its associated control 22. Switch fabric 19 forms data communication connections between processors 10-12, as opposed to contention communication connections between port circuits 18. Crossbar switch fabric 19 and control 22 is illustratively the SPECL crossbar switch of AT&T. Switch 15 further includes a common circuit 21 whose function is to cyclically generate the I.D.s of all port circuits 18 on one of contention buses 14. Circuit 21 is illustratively a conventional clock-driven resettable counter circuit.

Each port circuit 18 is connected to crossbar switch fabric 19 by a data link 20. Port circuits 18 are connected to each other by contention buses 14. Buses 14 provide the contention communication connections between port circuits 18.

The objective of switch 15 is to establish communication paths between processors 10-12. A communication path includes links 16 and 20 connecting one processor 10-12 to fabric 19, links 16 and 20 connecting a second processor 10-12 to fabric 19, and a connection through fabric 19 between the links of the two processors 10-12. Fabric 19 is a non-blocking fabric, and as such it supports the establishment of any communication paths at any time. However, links 16 and 20 each support only one communication path at a time. Hence, conflicting attempts at, or requests for, access by processors 10-12 to a link 16 and 20 must be resolved, through a process of arbitration. For this purpose, each link 16 and 20 includes a port circuit 18. A port circuit 18 arbitrates conflicting requests for access to its connected link by the processor connected to that link (the "connected processor") and by other processors. Alternatively, the arbitrated requests may be viewed as requests for access by the connected processor to another processor and requests for access by other processors to the connected processor.

Figure 2:
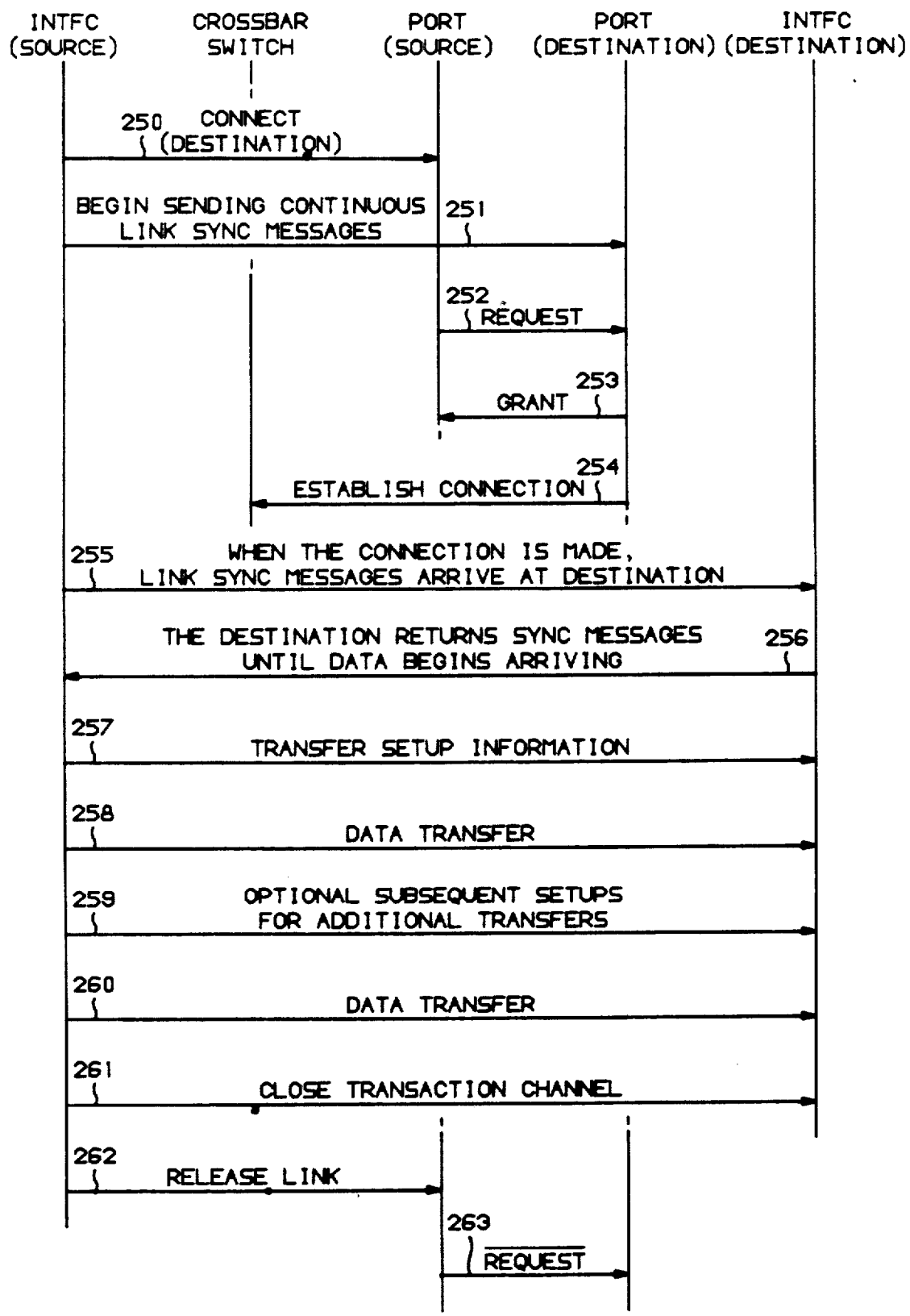
FIG. 2 is a functional diagram of interactions between a source and a destination processor of the multiprocessor of FIG. 1.

FIG. 2 illustrates the procedure followed to establish communications between two processors in the system of FIG. 1. When a source processor, illustratively 10, wishes to communicate with another—a destination—processor, its interface circuit 17 sends a connect command and an I.D. of the destination processor to the source processor's associated port circuit 18, at step 250. Circuit 17 then begins to send continuous link synchronization messages over link 16, at step 251, to establish a transaction channel between the two processors.

In response to the connect command, port circuit 18 of source processor 10 issues a request for destination processor 12 to port circuit 18 of processor 12 over contention buses 14, at step 252. Arbitration for access then takes place, in a manner described further below. When source processor 10 is granted access to processor 12, circuit 18 of destination processor 12 notifies circuit 18 of processor 10, at step 253. This received notification is used internally by circuit 18 of processor 10, but is not passed on to source processor 10. Port circuit 18 of destination processor 12 also causes fabric 19 to establish the desired data connection between processor 10 and 12, at step 254, in a manner discussed further below.

When the data connection is made, the link synchronization messages generated by interface circuit 17 of source processor 10 arrive by way of the connection at interface circuit 17 of destination processor 12, at step 255. Circuit 17 of processor 12 responds by returning link synchronization messages to circuit 17 of processor 10 over the connection, at step 256, in order to complete establishment of a transaction channel between the two processors. Circuit 17 of processor 12 continues to send the synchronization messages at step 256 until data begins to arrive from processor 10 at processor 12.

Circuit 17 of processor 10 responds to receipt of the link synchronization messages by sending to processor 12 information necessary to set up a data transfer between the two processors 10 and 12, at step 257. After the data transfer is set up at step 257, it proceeds at step 258.

When the transfer at step 258 is completed, processor 10 may optionally send to processor 12 information necessary to set up yet another transfer, at step 259, which transfer then proceeds at step 260. The steps 259-260 may be repeated a plurality of times.

When the last data transfer at step 260 is completed between processors 10 and 12, interface circuit 17 of source processor 10 sends a message to circuit 17 of destination processor 12 to close the transaction channel that has been established between the two processors, at step 261. Circuit 17 of processor 10 also sends a release link command to its associated port circuit 18, at step 262.

In response to the release command, port circuit 18 of source processor 10 removes its request for destination processor 12 to signal port circuit 18 of processor 12 that the connection between the two processors may be terminated.

In response to removal of the request, port circuit 18 of destination processor 12 either creates a new connection to satisfy a pending request, or simply leaves the old connection up if no requests are pending. Port circuit 18 of destination processor 12 also negates the notice of grant of access to source processor 10.

Figure 3:
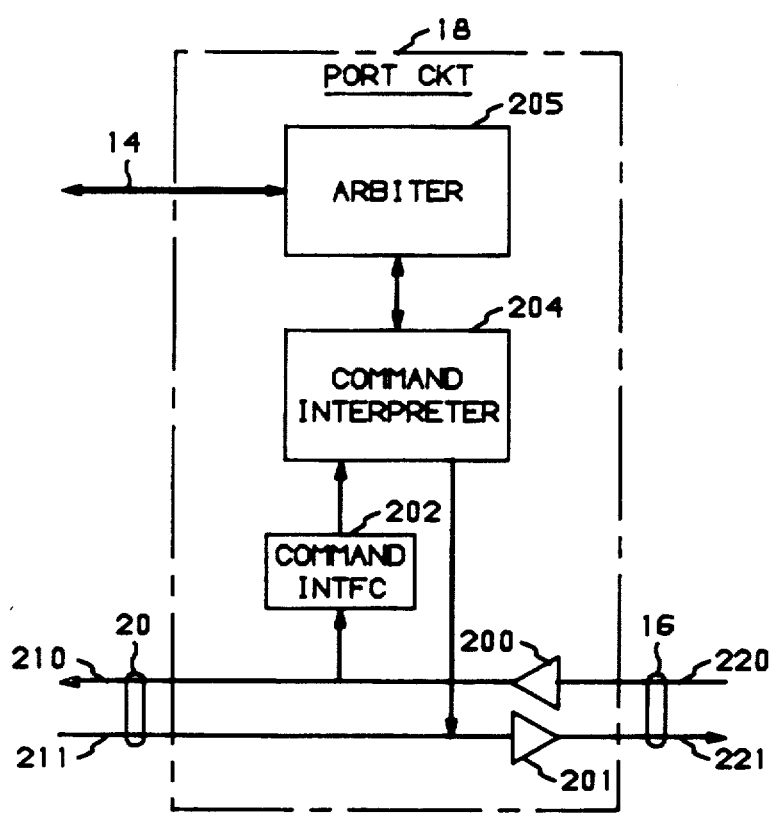
FIG. 3 is a block diagram of a port circuit of the multiprocessor of FIG. 1.

FIG. 3 shows an illustrative port circuit 18 in greater detail. Link 20 is an electrical serial link comprising two leads 210, 211, which conduct communications in opposite directions. Similarly, optical serial link 16 comprises two fibers 220, 221, which also conduct communications in opposite directions. Port circuit 18 connects leads 210, 211 to fibers 220, 221, respectively, through an optical receiver 200 and an optical transmitter 201, respectively. The transmitter 201 and receiver 200 merely convert signals between the optical and electrical domains. Such devices are well known in the art. For example, they may be the DC 2491 lightwave data link of Hitachi Corporation.

Connected to lead 210 of link 20 is a command interface circuit 202. Circuit 202 monitors signals passing on lead 210. It distinguishes commands being sent by interface circuit 17 of the associated processor to port circuit 18 from data being transmitted from associated processor 10-12 to another processor, retrieves those commands, converts them from serial to parallel format, and passes them to a command interpreter circuit 204. Illustratively, circuit 202 is the AM 7969 device of Advanced Micro-Devices, Inc.

Command interpreter 204 is a protocol handler. It receives commands from interface circuit 17 of the associated processor 10-12 through command interface 202 and forwards the received commands to an arbiter 205 of port circuit 18. Preferably, interpreter 204 is a state machine defined by the state diagram of FIG. 4. The design of such state machines is well known in the art.

Figure 4:
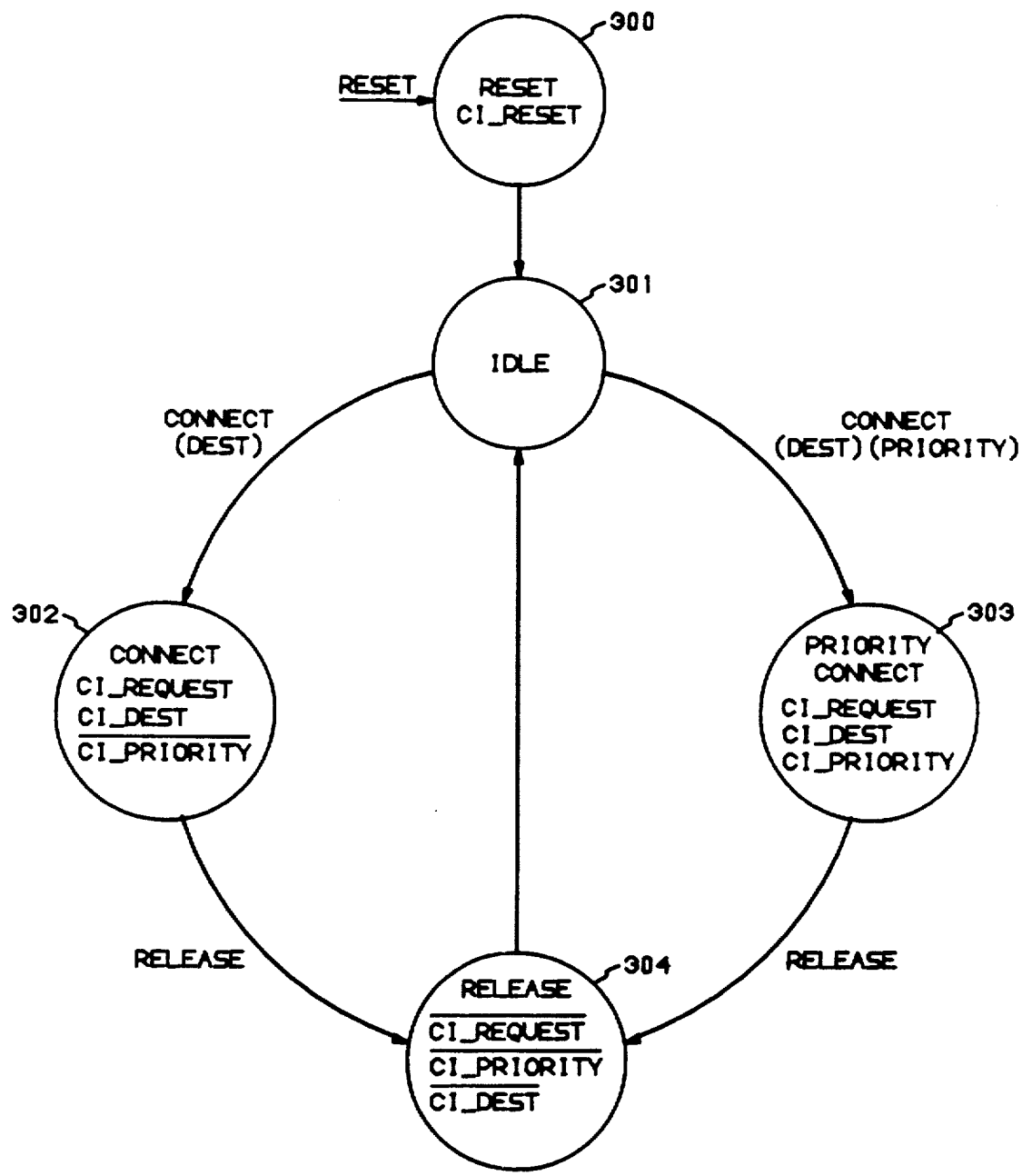
FIG. 4 is a state diagram of the command interpreter of the port circuit of FIG. 3.

As shown in FIG. 4, upon receipt of a "reset" command (e.g., upon system initialization), command interpreter 204 is sent from any current state to reset state 300. In state 300, command interpreter 204 pulses—momentarily asserts—a $ci\_reset$ signal line 430 (see FIG. 5) connecting it to arbiter 205. Command interpreter then enters idle state 301. In idle state 301, all signal lines connecting command interpreter 204 to arbiter 205 are negated.

When command interpreter 204 receives a "connect" command from interface circuit 17 while in idle state 301, it responds by entering connect state 302. A "connect" command is accompanied by a destination I.D. which identifies the destination processor 10-12 to which the source processor 10-12 wants to be connected. In connect state 302, command interpreter 204 asserts $ci\_request$ line 431 (see FIG. 5) leading to arbiter 205, and sends the destination I.D. to arbiter 205 over $ci\_dest$ lines 433.

When command interpreter 204 receives a "priority connect" command from interface circuit 17 while in idle state 301, it responds by entering priority connect state 303. A "priority connect" command is a "connect" command accompanied by a destination I.D. and a flag identifying this "connect" command as a high-priority request. In priority connect state 303, command interpreter 204 asserts $ci\_request$ line 431, places the destination I.D. on $ci\_dest$ lines 433, and additionally asserts $ci\_priority$ line 432 (see FIG. 5) leading to arbiter 205.

When command interpreter 204 receives a "release" command from interface circuit 17 while in either connect state 302 or priority connect state 303, it responds by entering release state 304 and negating signal lines 431-433. Command interpreter 204 then re-enters idle state 301.

As the above discussion of FIG. 4 shows, communications between port circuit 18 and interface circuit 17 are required only at a source processor 10-12, not at a destination processor 10-12.

Figure 5:
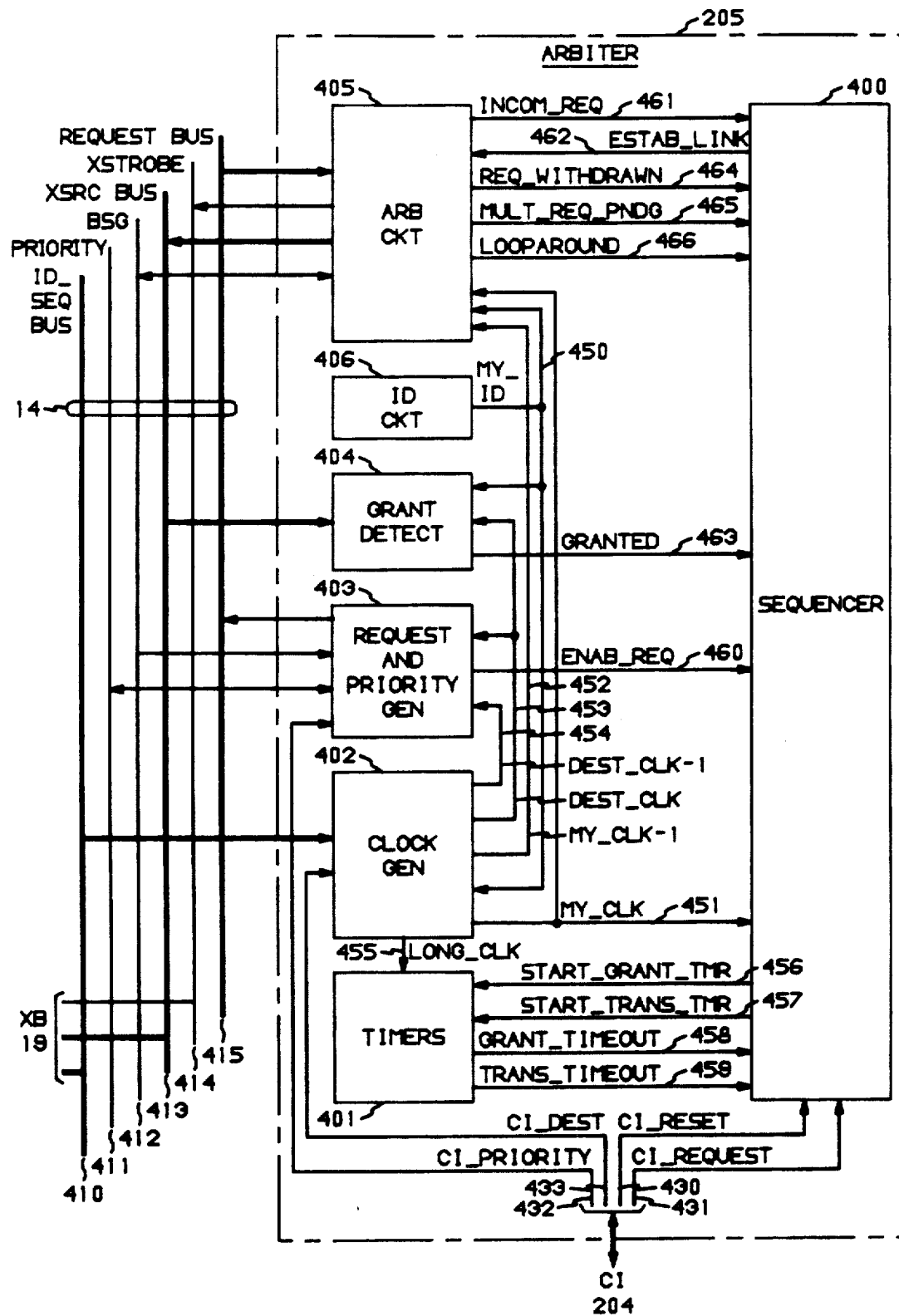
FIG. 5 is a block diagram of the arbiter of the port circuit of FIG. 3.

Returning to FIG. 3, arbiters 205 are responsible for resolving conflicting access requests within the system of FIG. 1, and for establishing and breaking requested communication paths through fabric 19 once the conflicts have been resolved. An illustrative arbiter 205 is shown in FIG. 5, along with individual buses 410-415 that together make up contention buses 14.

Considering first buses 14, $id\_seq$ bus 410 displays the I.D.s of port circuits 18, one after another in a cyclical manner. The I.D.s are generated and transmitted over bus 410 by common circuit 21 (see FIG. 1). The I.D. appearing on bus 410 indicates which destination port circuit 18 is presently being serviced by buses 14.

Request bus 415 comprises a plurality of leads each dedicated to a different port circuit 18. A source port circuit 18 asserts its lead of request bus 415 when it detects the I.D. of the desired destination port circuit 18 on id_seq bus 410 and finds bsg bus 412 not asserted.

Priority bus 411 is a single-lead bus which a source port circuit 18 asserts at the same time as it asserts its lead of request bus 415, to indicate to other source port circuits 18 that its access request is a priority request.

Xsrc bus 413 carries the I.D. of a source port circuit 18 which has been granted access to a destination port circuit 18. Destination port circuit 18 generates the I.D. of the selected source port circuit 18 on bus 413 when it detects its own I.D. on id_seq bus 410. Source port circuits 18 monitor xsrc bus 413 for their I.D.s to determine when their access requests have been granted.

Xstrobe bus 414 is a single-lead bus which is pulsed by destination port circuit 18 when the signal levels that it has generated on xsrc bus 413 have settled.

Control 22 of crossbar switching fabric 19 is connected to id_seq bus 410, xsrc bus 413, and xstrobe bus 414. Control 22 responds to a pulse on xstrobe bus 414 by causing fabric 19 to connect link 20 of port circuit 18 identified by the I.D. on id_seq bus 410 to link 20 of port circuit 18 identified by the I.D. on xsrc bus 413, thereby establishing a data connection between source and destination port circuits 18.

Bsg bus 412 is a single-lead bus which a destination port circuit 18 asserts whenever it is granting access to any but the last-remaining requester (i.e., access-requesting source port circuit 18) of a plurality of requesters who requested access simultaneously. Source port circuits 18 do not assert their leads of request bus 415 when bsg bus 412 is asserted. The result is that all simultaneous requests ("bus store group") for access to a destination port circuit 18 are serviced by that port circuit 18 before any subsequent requests for access to that port circuit 18 are serviced. Consequently, "fair" access to a destination port circuit 18 is provided for all requesting source port circuits 18, and no source port circuit 18 is "starved" for access to a destination port circuit 18.

Turning now to arbiter 205, it comprises a clock generation circuit 402, timers circuit 401, a sequencer 400, a plurality of combinatorial logic circuits 403-405, and an I.D. circuit 406. I.D. circuit 406 stores the I.D. assigned to port circuit 18 of which this arbiter 205 is a part. Illustratively, I.D. circuit 406 comprises a plurality of toggle switches by means of which the I.D. of port circuit 18 may be manually set. I.D. circuit 406 continuously generates the I.D. of port circuit 18 on my_id bus 450.

Id_seq bus 410 is connected to clock generation circuit 402, as is my_id bus 450 and ci_dest bus 433. Clock generation circuit 402 combines the inputs that it receives over buses 410, 433, and 450, in the following manner. While the I.D. on id_seq bus 410 equals the I.D. on my_id bus 450, circuit 402 asserts a my_clk signal line 451. While the I.D. on id_seq bus 410 is smaller by one than the I.D. on my_id bus 450, circuit 402 asserts a my_clk−1 signal line 452. While the I.D. on id_seq bus 410 equals the I.D. generated by command interpreter 204 on ci_dest bus 433, clock circuit 402 asserts a dest_clk signal line 453. And while the I.D. on id_seq bus 410 is smaller by one than the I.D. on ci_dest bus 433, clock circuit 402 asserts a dest_clk−1 signal line 454. Additionally, circuit 402 generates conventional clock signals on long_clk signal line 455.

Long_clk signal line 454 is connected to timers 401. Timers 401 are conventional timers, and have the following functions. Assertion of a start_grant_timer signal line 456 from sequencer 400 resets an interval counter, which then starts counting pulses on long_clk line 454 until start_grant_timer line 456 is negated, or until a predetermined count is reached.

Reaching of the predetermined count indicates that the port circuit 18 has not received grant of its requested access within a predetermined time allotted for that purpose. If and when the predetermined count is reached, the interval counter asserts a grant_timeout signal line 458 leading to sequencer 400, and maintains line 458 asserted until start_grant_timer line 456 is negated. In response to assertion of line 458, port circuit 18 cancels, i.e., removes, its outgoing request and instead grants a request for access to itself, i.e., an incoming request, if one is pending. Occurrence of any possible deadlock is thereby prevented.

Assertion of a start_transmission_timer signal line 457 from sequencer 400 resets an interval counter which then starts counting pulses on long_clk line 454 until start_transmission_timer line 457 is negated, or until a predetermined count is reached. Reaching of the count indicates that a communication session with another processor in which the connected processor is presently involved has lasted the allotted period of time, and it is time to break it in order to allow a new communication session to proceed. If and when the predetermined count is reached, the interval counter asserts a transmission_timeout signal line 459 leading to sequencer 400, and maintains line 459 asserted until start_transmission_timer line 457 is negated.

Figure 6:
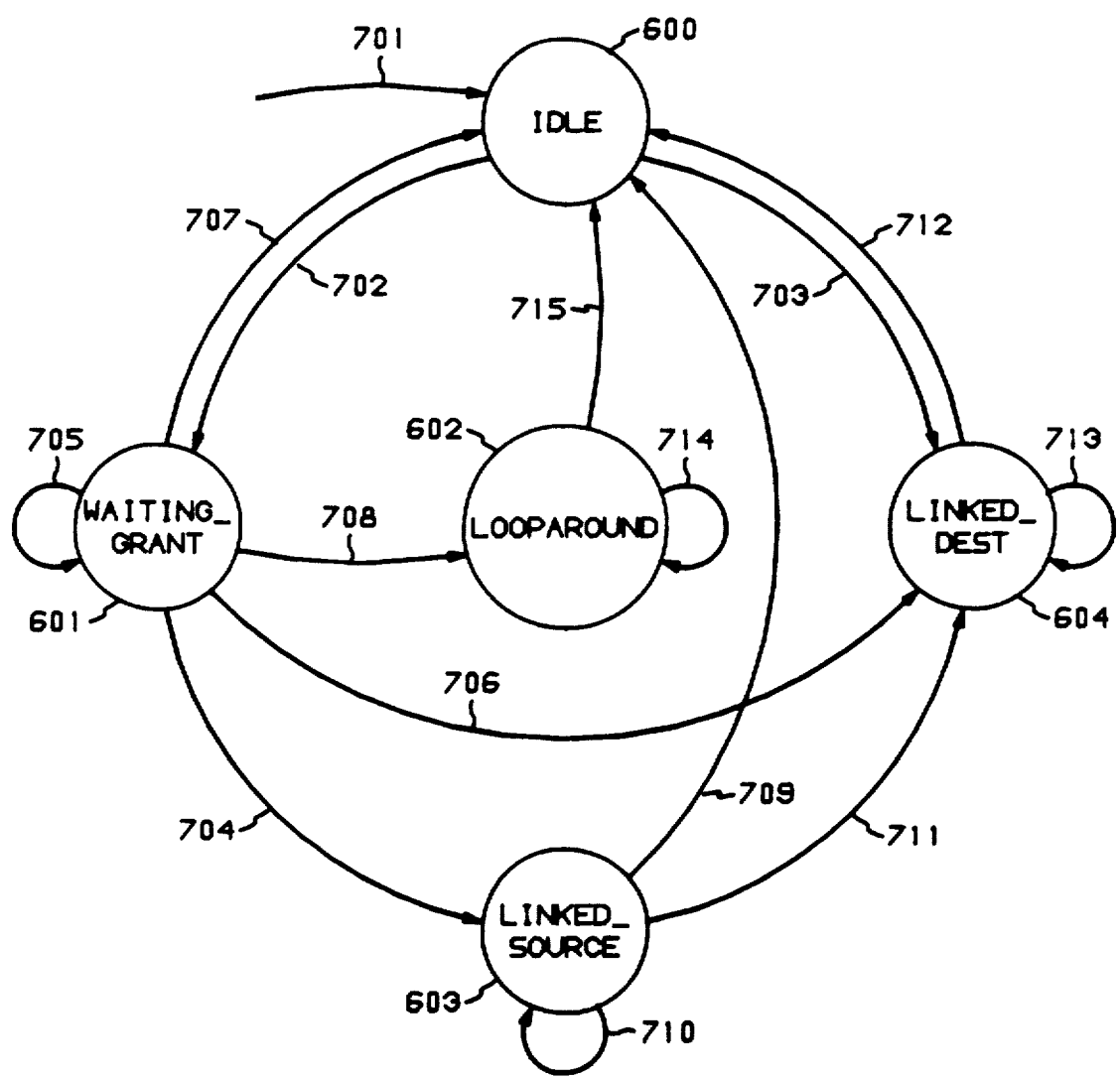
FIG. 6 is a state diagram of the sequencer of the arbiter of FIG. 5.

Sequencer 400 is a state machine defined by the state diagram of FIG. 6. The states and transition vectors of FIG. 6 are defined by the table of FIG. 7. Referring to these FIGS., sequencer 400 is sent from any state 600-604 into idle state 600 by assertion by command interpreter 204 of ci_reset line 430. In idle state 600, sequencer 400 maintains all of its output signal lines 456, 457, 460, and 462 negated.

In idle state 600, assertion by command interpreter 204 of ci_request line 431 causes sequencer 400 to assert enable_request signal line 460 and start_grant_timer line 456, and to negate other output lines. Sequencer 400 then enters waiting_grant state 601.

In idle state 600, assertion of incoming_request signal line 461 causes sequencer 400 to assert establish_link signal line 462 and start_transmission_timer line 457, and to negate other output lines. Sequencer 400 then enters linked_dest state 604.

In waiting_grant state 601, assertion of granted signal line 463 while ci_request line 431 is asserted causes sequencer 400 to assert enable_request line 460 and start_transmission_timer line 457, and to negate other output lines. Sequencer 400 then enters linked_source state 603.

In waiting_grant state 601, negation of both granted line 463 and grant_timeout line 458 while ci_request line 431 is asserted causes sequencer 400 to assert enable_request line 460 and to negate other output lines. Sequencer 400 then remains in waiting_grant state 601.

In waiting_grant state 601, assertion of grant_timeout line 458 while ci_request line 431 is asserted and incoming_request line 461 and granted line 463 are negated causes sequencer 400 to assert enable_request line 460 and start_grant_timer line 456, and to negate other output lines. Sequencer 400 then remains in waiting_grant state 601.

In waiting_grant state 601, assertion of ci_request line 431, incoming_request line 461, and grant_timeout line 458 while granted line 463 is negated causes sequencer 400 to assert establish_link line 462 and start_transmission_timer line 457, and to negate other output lines. Sequencer 400 then enters linked_dest state 604.

In waiting_grant state 601, assertion of incoming_request line 461 while ci_request line 431 is negated causes sequencer 400 to assert establish_link line 462 and start_transmission_timer line 457, and to negate other output lines. Sequencer 400 then enters linked_dest state 604.

In waiting_grant state 601, negation of ci_request line 431 and incoming_request line 461 causes sequencer 400 to negate all of its outputs and to return to idle state 600.

In waiting_grant state 601, assertion of ci_request line 431 and looparound signal line 464 causes sequencer 400 to assert enable_request line 460, establish_link line 462, and start_transmission_timer line 457, and to negate other output lines. Sequencer 400 then enters looparound state 602.

In linked_source state 603, negation of either ci_request line 431 or granted line 463 while incoming_request line 461 is also negated causes sequencer 400 to negate all of its outputs and to return to idle state 600.

In linked_source state 603, assertion of ci_request line 431 and granted line 463 while transmission_timeout line 459 is negated causes sequencer 400 to assert enable_request line 460 and to negate other output lines. Sequencer 400 remains in linked_source state 603.

In linked_source state 603, assertion of ci_request line 431, granted line 463, and transmission_timeout line 459 while incoming_request line 461 is negated causes sequencer 400 to assert enable_request line 460 and start_transmission_timer line 457, and to negate other output lines. Sequencer 400 remains in linked_source state 603.

In linked_sourced state 603, assertion of incoming_request line 461 while granted line 463 is negated causes sequencer 400 to assert establish_link line 462 and start_transmission_timer line 459, and to negate other output lines. Sequencer 400 then enters linked_dest state 604.

In linked_source state 603, assertion of incoming_request line 461 while ci_request line 431 is negated causes sequencer 400 to assert establish_link line 462 and start_transmission_timer line 457, and to negate other output lines. Sequencer 400 then enters linked_dest state 604.

In linked_source state 603, assertion of incoming_request line 431 and transmission_timeout line 459 causes sequencer 400 to assert establish_link line 462 and start_transmission_timer line 457, and to negate other output lines. Sequencer 400 then enters linked_dest state 604.

In linked_dest state 604, either assertion of request_withdrawn line 464 or assertion of multiple_requests_pending signal line 465 and transmission_timeout line 459 while request_withdrawn line 464 is negated, or assertion of ci_request line 431 and transmission_timeout line 459 while request_withdrawn line is negated, causes sequencer 400 to negate all of its outputs and to enter idle state 600.

In linked_dest state 604, negation of both request_withdrawn line 464 and transmission_timeout line 459 causes sequencer 400 to assert establish_link line 462 and to negate other output lines. Sequencer 400 remains in linked_dest state 604.

In linked_dest state 604, assertion of transmission_timeout line 459 while ci_request line 431, request_withdrawn line 464, and multiple_requests_pending line 465 are negated causes sequencer 400 to assert establish_link line 462 and start_transmission_timer line 457, and to negate other output lines. Sequencer 400 remains in linked_dest state 604.

In looparound state 602, assertion of ci_request line 431 while transmission_timeout line is negated causes sequencer 400 to assert enable_request line 460 and establish_link line 462, and to negate other output lines. Sequencer 400 remains in looparound state 602.

In looparound state 602, assertion of ci_request line 431 and transmission_timeout line 459 while multiple_requests_pending line 465 is negated causes sequencer 400 to assert enable_request line 460, establish_link line 462, and start_transmission_timer line 459, and to negate other output lines. Sequencer 400 remains in looparound state 602.

In looparound state 602, either negation of ci_request line 431, or assertion of ci_request line 431, multiple_requests_pending line 465, and transmission_timeout line 459, causes sequencer 400 to negate all of its outputs 456, 457, 460, and 462, and to enter idle state 600.

Returning to consideration of FIG. 5, request and priority circuit 403 is connected to the lead of request bus 415 that is dedicated to its own port circuit 18. Circuit 403 is also connected to the single-lead bsg bus 412 and priority bus 411. Circuit 403 asserts the request lead and priority bus 411 when enable_request line 460, dest_clk line 453, and ci_priority line 432 are asserted and bsg bus 412 was not asserted during the immediately-preceding assertion of dest_clk-line 452. Circuit 403 also asserts the request lead when enable_request line 460, and dest_clk line 453 are asserted and bsg bus 412 and priority bus 411 were not asserted during the immediately-preceding assertion of dest_clk−1 line 452. In other words, circuit 903 asserts the request lead when the desired destination circuit 18 does not have a bus store group formed.

The assertion of the request lead of request bus 14 by this source port circuit 18 represents one of possibly multiple requests that the destination port circuit 18 will detect in that interval of time. But this request will not usurp the "fair access" afforded to previous requesters, because the request lead will not be asserted if the bsg bus 412 was asserted by the destination port circuit 18 in the previous clock interval. Additionally, this request will defer to any priority requests, because it will not be asserted if priority bus 411 was asserted by any requester in the previous clock interval.

Circuit 403 continues to assert the request lead until enable_request line 460 is negated.

Circuit 403 asserts priority bus 411 when enable_request line 460, ci_priority line 432, and dest_clk−1 lines 454 are asserted and bsg bus 412 is not asserted. Circuit 403 continues to assert priority bus 411 until enable_request line 460 is negated.

Grant detect circuit 404 is connected to xsrc bus 413. Circuit 404 asserts granted line 463 when the I.D. on xsrc bus 413 matches the I.D. output on my_id lines 450 by I.D. circuit 406, while dest_clk line 453 is asserted.

The matching I.D.s on bus 413 and lines 450 indicate that access has been granted to this port circuit 18. Assertion of dest—clk line 453 indicates that the desired destination's I.D. is appearing on id—seq—bus 410. Hence, granted line 463 is asserted by circuit 404 when the desired destination port circuit 18 has granted access to this requesting source port circuit 18.

Figure 8:
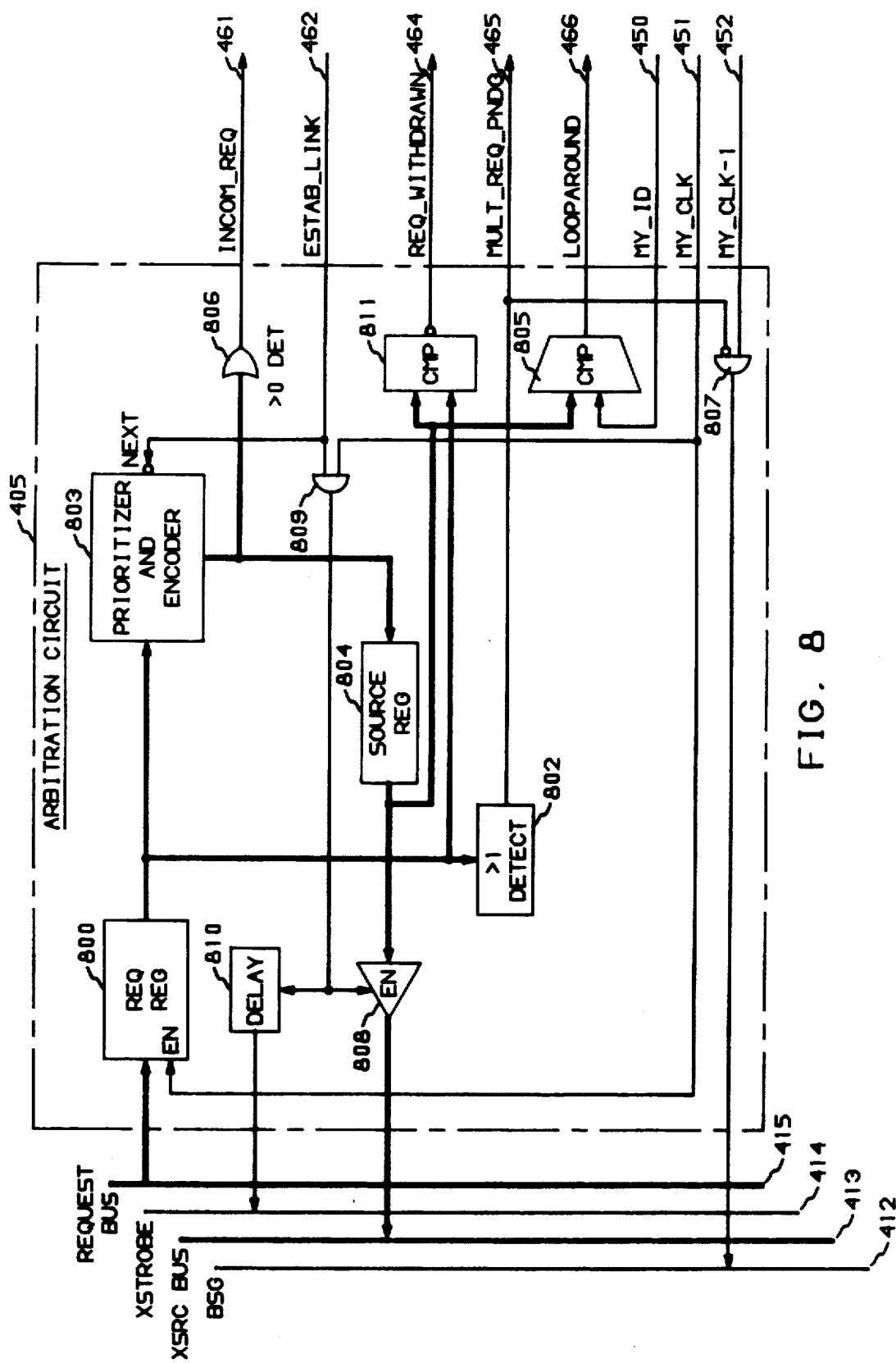
FIG. 8 is a functional schematic diagram of the arbitration circuit of the arbiter of FIG. 5.

Arbitration circuit 405 resolves conflicting requests for access to its port's associated link 16, 20. Circuit 405 is shown in greater detail in FIG. 8.

Circuit 405 includes a request register 800 connected to request bus 415. Operation of register 800 is controlled by my—clk line 451. When my—clk line 451 is asserted (i.e., the I.D. of this port circuit 18 is appearing on id—seq bus 410), it causes register 800 to record all presently-asserted leads of bus 415, i.e., to latch and store all present requests for access to this port's link 16, 20.

A detection circuit 802 is connected to the outputs of register 800 on which are displayed the register's contents. Circuit 802 detects in a conventional manner whether more than one request is latched by register 800. If so, circuit 802 asserts multiple—requests—pending line 465.

A prioritization and encoding circuit 803 is also connected to the outputs of register 800. In a conventional manner, circuit 803 selects the highest priority pending request latched by register 800 and encodes that request into the I.D. of the requesting source port circuit 18.

Illustratively, the relative priority of circuits 18 is based on the relative, sequential, ordering of their I.D. numbers. Illustratively, the prioritization and encoding circuit 803 detects the most-significant asserted request bit in request register 800 and encodes that bit's position into binary form.

A source register 804 is connected to the output of circuit 803 and stores the I.D. generated by circuit 803. Source register 804 is latched whenever there is a change in the highest priority requester i.e., whenever the output of circuit 803 changes, as would happen when a port circuit 18 that is being serviced withdraws its request.

A comparator circuit 805 is connected to the output of register 804 and to my—id lines 450. Circuit 805 compares the I.D. generated by circuit 803 with the I.D. stored by I.D. circuit 406, and asserts looparound line 466 when the two match. The match indicates that this port circuit 18 is requesting access to its own link 16, 20, for test purposes.

Also connected to the output of circuit 803 is a detector circuit 806, illustratively an OR circuit. Circuit 806 detects whether at least one request for access to this port circuit 18 is pending, i.e., whether circuit 803 is generating the I.D. of a port circuit 18. If so, circuit 806 asserts incoming—request line 461. An I.D. of zero is invalid for a port circuit 18; it represents no requests pending.

My—clock-1 line 452 is connected to an input of AND circuit 807. Multiple—requests—pending line 465 is connected to an inverted input of circuit 807. The output of circuit 807 is connected to bsg bus 412. When more than one access request to this port circuit 18 is pending and this port circuit 18 is the next to be serviced by contention buses 14, circuit 807 asserts bsg bus 412 to indicate to other port circuits 18 that all pending access requests have not yet been serviced. This indication causes the other port circuits 18 to not assert new requests for access to this destination port circuit 18.

The output of source register 804 is also connected to xsrc bus 413 through gate 808. Operation of gate 808 is controlled by an AND circuit 809, whose inputs are connected to establish—link line 462 and my—clk line 451. When line 462 indicates that sequencer 400 commands establishment of a data connection to a source port circuit 18, and line 451 indicates that this port circuit 18 is presently being serviced by contention buses 14, circuit 809 generates a signal to enable gate 808 to output the I.D. stored by source register 804 onto xsrc bus 413. This same signal generated by circuit 809 passes through a delay circuit 810 and then pulses xstrobe bus 414.

Establish—link line 462 is also connected to a control input of circuit 803. Negation of line 462 causes circuit 803 to ignore the previously-highest I.D. and to select and encode the next highest I.D. of the highest-priority port circuit 18 now indicated by register 800 to be requesting access to this destination port circuit 18.

Negation of line 462 is not the normal manner of terminating a communication connection. Normally, the source port circuit 18 removes its request from request bus 415 to signal termination of a connection. However, negating of establish—link line 462 to break communications allows destination port circuit 18 to react to transmission timeouts, or to abnormal termination requests from the destination processor 10-12.

The outputs of source register 804 and request register 800 are also connected to a comparator circuit 811. Circuit 811 determines whether the I.D. stored by source register 804 corresponds to an asserted bit in the request register 800. If not, it means that the requesting port circuit 18 which presently has access to this port circuit's link 16, 20 has withdrawn its request as an indication that it is terminating the existing data connection. Circuit 811 asserts request—withdrawn line 466 to notify sequencer 400 of the termination.

It will be noted that access arbitration at each destination port circuit 18 is autonomous. A port circuit's arbiter 205 does not wait on transactions involving other pairs of port circuits 18. Also, arbitration does not contribute to latency: new bus store group formation and request prioritization occurs while the last request pending in a previous bus store group is serviced. Also, the data connection between processors is direct and immediate in that it bypasses arbiters 205 and does not await arrival of an "access granted" signal.

Fair access to a destination between contending sources is ensured by grouping simultaneous requests for a destination into a so-called bus store group. All requests in a bus store group are serviced before a new bus store group is formed and serviced. The bus store group is formed by the destination port circuit's arbitration circuit 205 by asserting bsg bus 412 at time my—clk—1. All port circuits 18 requesting access to that destination port circuit 18 look at bsg bus 412 at that time, which to them is dest—clk—1. Any source that had a request for that destination pending prior to assertion of bsg bus 412 may continue to assert its request. Other sources must wait to assert their requests until a dest—clk—1 time when bsg bus 412 is not asserted.

Deadlock between processors 10-12 occurs when two processors 10-12 make mutually-incompatible requests, such as when processor 10 makes a request for access to processor 11 while processor 11 has a request for access to processor 10 pending. For deadlock prevention, a requester is allowed to "back out" of a bus store group. "Backout" means that a source port circuit 18 is allowed to withdraw its request signal before it is granted access to destination port circuit 18. Backout is effected by means of a time-out mechanism: a source port circuit 18 starts its grant timer when it makes an access request, and if the access has not been granted before the timer times out, the port circuit 18 removes its request and accepts (grants) the next incoming pending access request (thereby becoming a destination port circuit 18).

Data connections between processors 10-12 are effected only by destination port circuit 18. A destination port's sequencer 400 allows arbitration circuit 405 to make a connection by asserting establish-link signal line 464. When its own I.D. appears on id—seq bus 410, destination port 18 puts the I.D. of source port circuit 18 which is being granted access out onto xsrc bus 413, and issues a strobe signal on xstrobe bus 414 to control 22 of crossbar fabric 19. The strobe is issued again by destination port circuit 18 each time the I.D. on id—seq bus 40 equals the I.D. on my—id bus 450 while establish-link signal line 464 is asserted.

In response to each strobe signal on xstrobe bus 414, crossbar fabric 19 reads the source I.D. from xsrc bus 413 and the destination I.D. from id—seq bus 410 and establishes a data connection between the two processors identified by those I.D.s.

Data connections are terminated only by destination port circuits 18. The connections are terminated in response to either the source's request signal being removed from request bus 415, or a transmission timer timeout within destination port circuit 18 with other requests pending.

When a connection is terminated without the source's involvement (i.e., a transmission timer timeout), the source is made aware of it via xsrc bus 413: when its' I.D. does not appear on xsrc bus 413 during the dest—clk cycle, then the source knows that destination port circuit 18 has terminated the connection.

Terminated connections are not immediately torn down (i.e., physically terminated) by crossbar fabric 19. Fabric maintains previously-made connections until it is called upon to make a new connection to one of the processors 10-12 involved in the old connection.

To provide processors 10-12 with equal opportunity to send data and to receive data, arbiters 205 of destination port circuits 18 interleave incoming and outgoing accesses (i.e., access grants and access requests). Assertion of request—withdrawn signal line 464 informs sequencer 400 of a break between servicing incoming access requests that have been queued up. At that point, if sequencer 400 detects an outgoing access request, it negates establish—link line 462 and effects performance of the outgoing access request via request and priority generation circuit 403. Negation of multiple—requests—pending line 465 is used to inform sequencer 400 that no requests, other than the one being serviced, are pending. If no other requests are pending, the presently-established communication link through fabric 19 will typically be maintained, because the principle of locality of reference suggests that the next desired communication path will be to the same processor as now.

Of course, it should be understood that various changes and modifications to the illustrative embodiment described above will be apparent to those skilled in the art. Changes and modifications can be made without departing from the spirit and the scope of the invention and without diminishing its attendant advantages. It is therefore intended that all such changes and modifications be covered by the following claims.

I claim:

1. A multiprocessor system comprising:
   a plurality of processors;
   a non-blocking communication medium interconnecting the plurality of processors;
   a control communication medium interconnecting the plurality of processors;
   means in each processor for communicating to another processor across the control medium a request to access the other processor;
   resolving means associated with each processor, each resolving means responsive to conflicting requests for access to the associated processor received from other processors across the control medium, for resolving the conflicts and selectively granting the requests for access to the associated processor; and
   means, responsive to the granting of a request, for establishing a connection through the non-blocking communication medium between a requesting processor whose request was granted and a granting processor which granted the request.

2. The system of claim 1 wherein
   the means for establishing a connection is a single, centralized, apparatus responsive to the request granting means of all of the processors.

3. The system of claim 2 further comprising:
   means in each processor, responsive to the granting of a request by the associated processor's granting means, for communicating the grant across the control communication medium to the processor whose request was granted.

4. The system of claim 1 wherein the conflict resolving means comprises means for prioritizing the conflicting requests and granting the requests sequentially in their order of priority.

5. The system of claim 1 wherein the non-blocking communication medium comprises:
   a crossbar switch; and
   a plurality of optical links each connecting a different processor to the crossbar switch.

6. A multiprocessor system comprising:
   a plurality of processors;
   a non-block communication medium;
   a plurality of communication links, each connecting a processor to the non-blocking communication medium;
   a control communication medium interconnecting the plurality of processors;
   means in each processor for cummunicating to another processor across the control communication medium a request to access the communication link of the other processor;
   resolving means associated with each processor, each resolving means responsive to received conflicting requests for access to the communication link of the associated processor, for resolving the conflicts and selectively granting the access requests; and
   means, responsive to the granting of a request, for establishing a connection through the non-blocking communication medium between the communication link of a requesting processor whose request was granted and the communication link to which the granted access was requested.

7. The system of claim 6 further comprising:

means in each processor, responsive to the granting of a request by the associated processor's granting means, for communicating the grant across the control communication medium to the processor whose request was granted; and means in the processor whose request was granted, responsive to receipt of the communicated grant for measuring time elapsed since the grant was received and causing the associated request granting means to grant a pending request for access to the associated communication link when a predetermined time has elapsed.

8. The system of claim 6 wherein the request granting means interleave granting of access requests of processors other than the associated processor with granting of access requests of the associated processor.

9. The system of claim 6 wherein the request granting means are responsive to conflicting requests for access to the link of the associated processor made both by the other processors and by the associated processor for resolving the conflicts and selectively granting the access requests.

10. The system of claim 9 wherein the request granting means grant the access requests sequentially.

11. The system of claim 10 wherein the request granting means interleave granting of access requests of processors other than the associated processor with granting of access requests of the associated processor.

12. The system of claim 6 further comprising:

means in each processor, responsive to the granting of a request by the associated request granting means, for measuring time elapsed since the request was granted and causing the associated request granting means to grant another request when a predetermined time has elapsed.

13. The system of claim 9 wherein the request communicating means are responsive to the granting, by the associated request granting means, of a request of the associated processor, for communicating to another processor a request by the associated processor to access the communication link of the other processor.

14. The system of claim 13 further comprising:

first means in each processor, responsive to the granting of a request of the associated processor by the associated request granting means, for measuring time elapsed since the request was granted and indicating when a predetermined time has elapsed; and wherein the request communicating means further are responsive to the indication by the first time measuring and indicating means, for communicating to the other processor a cancellation of the request by the associated processor to access the communication link of the other processor.

15. The system of claim 14 further comprising:

second means in each processor, responsive to the granting of a request by the associated request granting means, for measuring time elapsed since the request was granted and indicating when a predetermined time has elapsed; and wherein the request granting means further are responsive to the indication by the second time measuring and indicating means, for granting another request.

16. A multiprocessor system comprising:

a plurality of processors;

a non-blocking communication medium interconnecting the plurality of processors;

a plurality of port circuits, one connected to each processor, each port circuit having a different I.D.;

a contention medium interconnecting the plurality of port circuits; and transmission means for cyclically, sequentially transmitting the I.D.s of the plurality of port circuits on the contention medium;

each port circuit comprising first means, responsive to a request from the connected processor for access to another processor, for transmitting the request to the other processor accross the contention medium when the I.D. of the other processor's port circuit is being transmitted on the contention medium by the transmission means, second means for storing requests transmitted on the contention medium when the I.D. of the port circuit that includes the second means is transmitted on the contention medium by the transmission means, third means for prioritizing requests stored by the second means, fourth means for determining when the connected processor is ready for access by another processor, and fifth means, responsive to determination by the fourth means that the connected processor is ready for access by another processor, for transmitting on the contention medium the I.D. of the port circuit having a highest-priority pending request stored by the second means, when the I.D. of the port circuit that includes the fifth means is transmitted on the contention medium by the transmission means;

the non-blocking communication medium responsive to transmission by one of the fifth means on the contention medium of the I.D. of a port circuit, for establishing a connection between the processors connected to the port circuits whose I.D.s are simultaneously transmitted on the contention medium by the one of the fifth means and the transmission means.

17. The system of claim 16 further comprising:

sixth means, responsive to transmission by the one of the fifth means on the contention medium of the I.D. of the port circuit that includes the sixth means, for notifying the fourth means that an access to another processor by the connected processor has been granted.

18. The system of claim 16 wherein the non-blocking communication medium comprises:

a crossbar switch, and a plurality of optical links each connecting a different processor to the crossbar switch.

19. The system of claim 18 wherein each optical link further connects the connected processor to the processor's port circuit.

* * * * *